Patented May 17, 1938

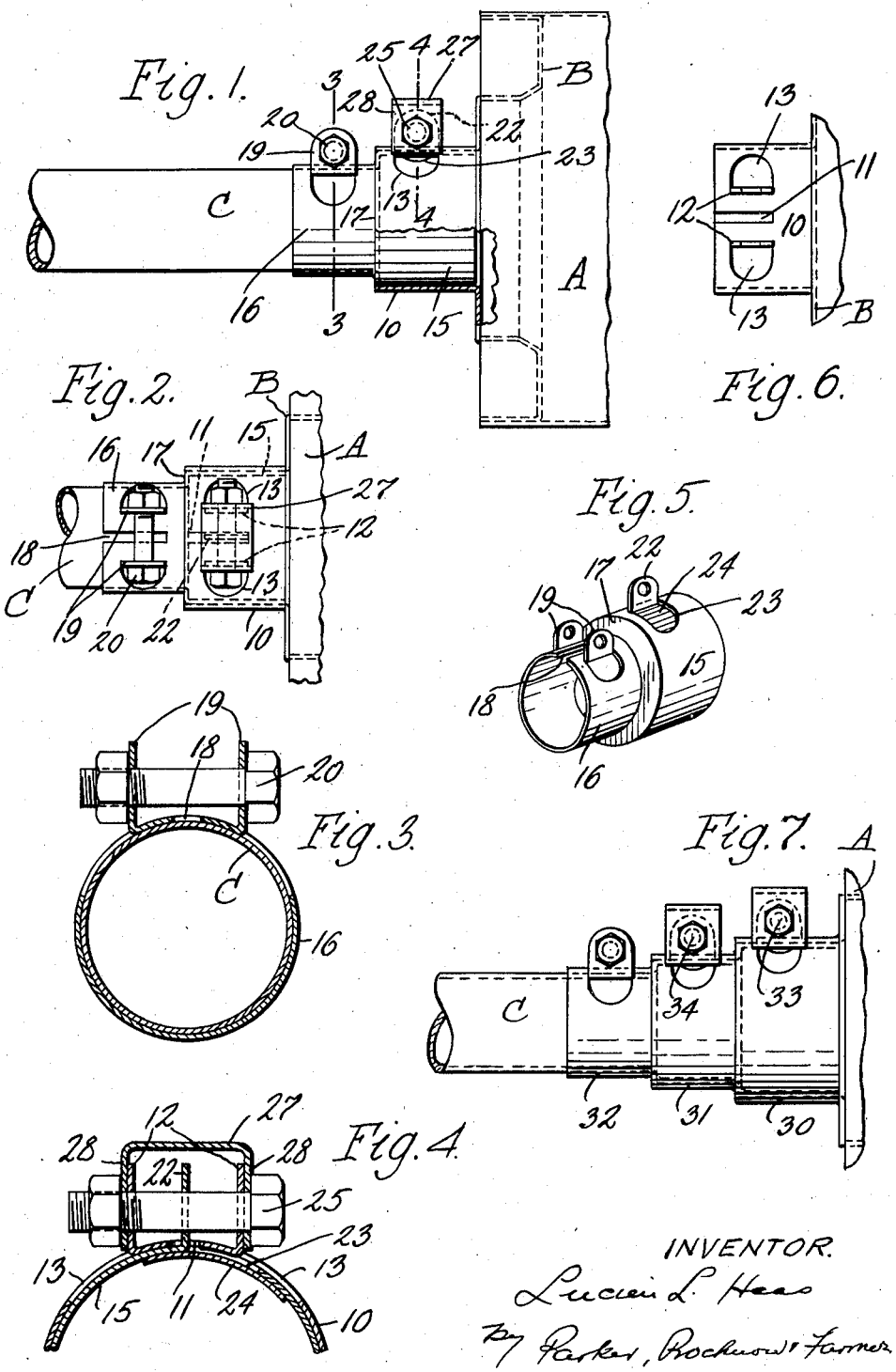

2,117,955

UNITED STATES PATENT OFFICE 2,117,955

TUBULAR CONNECTER

Lucien L. Haas, Buffalo, N. Y., assignor to Buffalo Pressed Steel Company, Buffalo, N. Y.

Application October 12, 1936, Serial No. 105,161

6 Claims. (Cl. 285—198)

This invention relates to improvements in tubular connecters or adapters of the kind which may be used for connecting two tubular members of different diameters.

One of the objects of this invention is to provide a tubular connecter of this kind of improved and simplified construction for making a secure joint between two tubular members of different diameters. Another object of this invention is to provide a connecter of this kind which is particularly adapted for use in connecting pipes of different diameters with mufflers or silencers of the kind commonly used in connection with internal combustion engines.

Other objects of this invention will appear from the following description and claims.

In the accompanying drawing:

Fig. 1 is a side view of an end of a muffler and a pipe connected therewith and showing a connecter embodying this invention, which forms a joint or connection between a pipe and a tubular projection or duct of an end of a muffler.

Fig. 2 is a top plan view thereof.

Fig. 3 is a transverse section thereof, on an enlarged scale, on line 3—3, Fig. 1.

Fig. 4 is a fragmentary transverse sectional view on line 4—4, Fig. 1.

Fig. 5 is a perspective view of the connecter.

Fig. 6 is a fragmentary top plan view of a tubular projection or duct of the muffler with which the tubular connecter embodying this invention is intended to cooperate.

Fig. 7 is a side view of a connection between a muffler and a pipe in which a composite connecter is formed by employing two connecters of different sizes.

In Figs. 1 and 2, A represents the shell of the muffler provided at an end thereof with a head B which closes the end of the shell A and which is provided with a tubular projection or duct 10 of the kind commonly employed on mufflers and within which the exhaust pipe leading from an engine or the tail pipe for carrying gases from the muffler may telescope. In order to form a tight connection between the tubular projection or duct 10 and the pipe to be connected therewith, this duct is usually provided with a slit 11, see also Fig. 6, extending from the outer end thereof inwardly, and with a pair of outwardly extending lugs 12 arranged at opposite sides of the slit 11 and provided with apertures through which a bolt may extend for drawing the lugs toward each other and thus contracting or tightening the slitted end of the duct 10 about the pipe. If desired, the lugs 12 may be formed of integral parts of the duct 10 which are stamped out and bent upwardly, thus leaving apertures 13 in the duct, which, however, are closed when the pipe with which the duct is intended to cooperate telescopes within the duct.

When mufflers are produced for use on a specific make or type of engine or vehicle, the tubular projections or ducts 10 are, of course, made of an internal diameter adapted to fit snugly around the exhaust and tail pipes used on such engine or vehicle. When, however, mufflers are sold for replacement of mufflers which have become worn out or damaged, it is impractical for a dealer to carry in stock a complete line of mufflers having ducts or tubular projections 10 of the various diameters to correspond to the various sizes of exhaust and tail pipes used on the numerous different engines and cars. In order to avoid the necessity for carrying in stock a large number of different mufflers differing from each other only in the size of tubular projections or ducts 10, I have provided a tubular connecter which may be made in various sizes and diameters to enable the muffler to be connected with pipes of a plurality of different sizes.

My connecter includes two tubular parts 15 and 16 of different diameters and secured together in any suitable manner, such for example as by means of an annular wall 17 connecting the two tubular parts. The tubular part 15 is intended to fit within the projection or duct 10 of a muffler, and is consequently, substantially imperforate and of such a size as to fit snugly within the duct 10. The other tubular part 16 of the connecter is of a construction similar to that commonly employed in the tubular projections or ducts 10 of muffler heads and includes a cylindrical portion having a slit 18 extending from the outer end thereof toward the connecting wall 17 and provided with a pair of lugs 19 struck up from the cylindrical portion of the part 16 and arranged at opposite sides of the slit 18, so that a bolt 20 may pass through the holes in the lugs to clamp the tubular part 16 securely about a pipe C.

In order to provide for a secure connection between the tubular part 15 and the duct 10, I preferably provide on the tubular part 15 of the connecter an outwardly extending projection or apertured lug 22, which may be secured on this tubular part in any suitable or desired manner. For example, the lug 22 may be struck out of the tubular part 15 as has heretofore been in common practice, thus leaving an aperture 23. In order to prevent the escape of exhaust gases through this aperture, I preferably provide on the inner face of the tubular part 15, a cover plate 24 which extends across the aperture 23 and which may be welded or otherwise secured to the inner face of the tubular part 15 of the connecter.

In the use of the connecter herein described, the tubular part 15 is inserted into the tubular projection or duct 10 so as to fit snugly within the same and so that the lug 22 is passed into the slit 11 of the duct 10. When the part 15 of the connecter is thus in position in the duct 10, the lug 22 will be arranged between the lugs 12 of the duct 10, and consequently, a bolt 25 connecting the lugs 12 also passes through the aperture in the lug 22. This prevents displacement or endwise movement of the connecter with reference to the duct 10 and forms a secure connection between the connecter and the muffler head. If desired to insure an adequate and correct tightening of the slitted end of the duct about the part 15 of the connecter, a U-shaped bridge member 27 may be provided having downwardly extending legs 28 which extend along the outer faces of the lugs 12 and which are provided with apertures in registration with the apertures of the lugs 12 and 22 so that the bolt 25 may pass through the several alined apertures and upon tightening the bolt, the slitted portion of the duct 10 is clamped about the part 15 of the connecter without deformation of the lugs 12.

The pipe C may be connected with the part 15 of the connecter in the usual manner by inserting the pipe into the tubular part 16 and the bolt 20 extending through the apertures in the lugs 19 is then tightened so that the connecter is securely clamped on the pipe C.

The two parts 15 and 16 of the connecter may be made of different diameters to fit muffler ducts and pipes of different diameters and when a dealer is provided with a series of these connecters of different diameters, a certain type of muffler may be readily adapted to various sizes of exhaust or tail pipes. The construction described also has the advantage that because of the fact that the lug 22 is rigidly connected by means of the bolt 25 with the lugs 12, it is not necessary to make the part 15 of the connecter of as heavy metal as the tail or exhaust pipes, and consequently, it is not necessary to apply as much pressure in clamping the duct 10 to the tubular part 15 as would otherwise be necessary, since the mechanical connection between the duct 10 and the tubular part 15 is established by means of the lug 22 rather than by the friction between the duct 10 and the part 15. Consequently, there is less danger of damaging or buckling the tubular part 15 of the connecter than would be the case if it were necessary to clamp the duct 10 as tightly around the part 15 of the connecter as the duct would be clamped around an exhaust or tail pipe.

The connecters described may be used singly to form a connection between a muffler duct and a pipe, as shown in Figs. 1 to 5, or a composite connecter may be formed of two or more connecters, as shown in Fig. 7, in which a muffler is shown having a slitted contractible duct 30. In this figure, the duct 30 is shown as connected with a pipe C by means of a composite connecter formed of two connecters, but it will be understood that any desired number of connecters may be employed to form the composite connecter. In this figure, the first connecter has the imperforate or non-contractible part thereof corresponding to the part 15 thereof telescoped within the duct 30, and a slitted contractible tubular part 31 which corresponds to the part 16 described in connection with Figs. 1 to 5. If this tubular part 31 is not small enough to fit snugly around a pipe C a second connecter may be provided having its non-contractible tubular part telescoped within the part 31 of the first connecter unit. The second connecter unit also has a contractible slitted tubular part 32 which may be clamped about the pipe C. The first connecter unit may also be provided with a lug or projection entering the slit of the duct 30 of the muffler and held in place by a bolt 33, and the second connecter unit also has a lug or projection entering the slit of the contractible tubular part 31 and held in place relatively to the first connecter unit by means of a bolt 34. It will thus be seen that my improved connecter forms an equally rigid and secure connection between a pipe and a muffler, whether the connecter is formed of a single piece or whether the connecter is a composite one formed of a number of connecters or units. Such composite connecters are particularly desirable in case single connecters of the desired sizes are not available when an installation of a muffler is being made.

I claim as my invention:

1. A tubular connecter for connecting a pipe with a duct having a slitted end adapted to be contracted, said connecter including a substantially imperforate tubular part adapted to be inserted into said duct and having a lug arranged to enter into the slitted part of said duct, means for contracting said slitted end about said tubular part and engaging said lug to hold said tubular part in place in said duct, and a tubular part of different diameter connected with said first mentioned tubular part and adapted to be contracted about said pipe.

2. A tubular connecter for connecting a pipe with a duct having a slitted end and having lugs at opposite sides of said slit for contracting the slitted end of said duct, said connecter including a substantially imperforate tubular part formed to telescopically fit into said duct and having a lug adapted to enter into the slit of said duct and extend between the lugs of said duct, all of said lugs being apertured, and a bolt extending through the apertures of said lugs of said duct and connecter for holding said duct and connecter against relative displacement and for contracting said duct about said imperforate tubular part of said connecter, and a second tubular part having a gas-tight connection with said first tubular part and formed to be telescopically secured to said pipe.

3. A tubular connecter for connecting a pipe with a duct having a slitted end and having lugs at opposite sides of said slit for contracting the slitted end of said duct, said connecter including a substantially imperforate tubular part adapted to be inserted into said duct and having a lug adapted to enter into the slit of said duct and between the lugs of said duct, all of said lugs being apertured, and a bolt extending through the apertures of said lugs of said duct and connecter for holding said duct and connecter against relative displacement and for contracting said duct about said imperforate tubular part of said connecter, a second tubular part of different diameter than said mentioned tubular part and having a gas-tight connection therewith and adapted to be secured in telescopic arrangement to said pipe, and a bridge member connecting the outer ends of the lugs of said duct and having parts extending into contact with the other faces of said lugs, and having apertures through which a bolt connecting said lugs may pass to prevent deformation of the lugs of said duct when said bolt is tightened.

4. A tubular connecter for connecting a pipe with a duct having a slitted end, said connecter including a substantially imperforate tubular part adapted to be inserted into said duct and having a projection extending into said slit, means for contracting said duct about said tubular part to provide a locking engagement with said projection to prevent displacement of said tubular part relatively to said duct, and a second tubular part having a gas-tight connection with said first tubular part and adapted to be secured to a pipe.

5. A connection for two tubular parts including one tubular part having a slitted end formed to be contracted, and a second tubular part formed to telescope into said first tubular part and about which the latter may be contracted, said second part having a projection which extends into the slit in said first part to hold said tubular parts against relative rotation.

6. A connection for two tubular parts including one tubular part having a slitted end, means for contracting said slitted end of said part, a second tubular part formed to telescope into said first part and having a projection which extends into the slit in said first part, said contracting means also holding said projection in said slit to retain said tubular parts in telescopic relation.

LUCIEN L. HAAS.